UNITED STATES PATENT OFFICE.

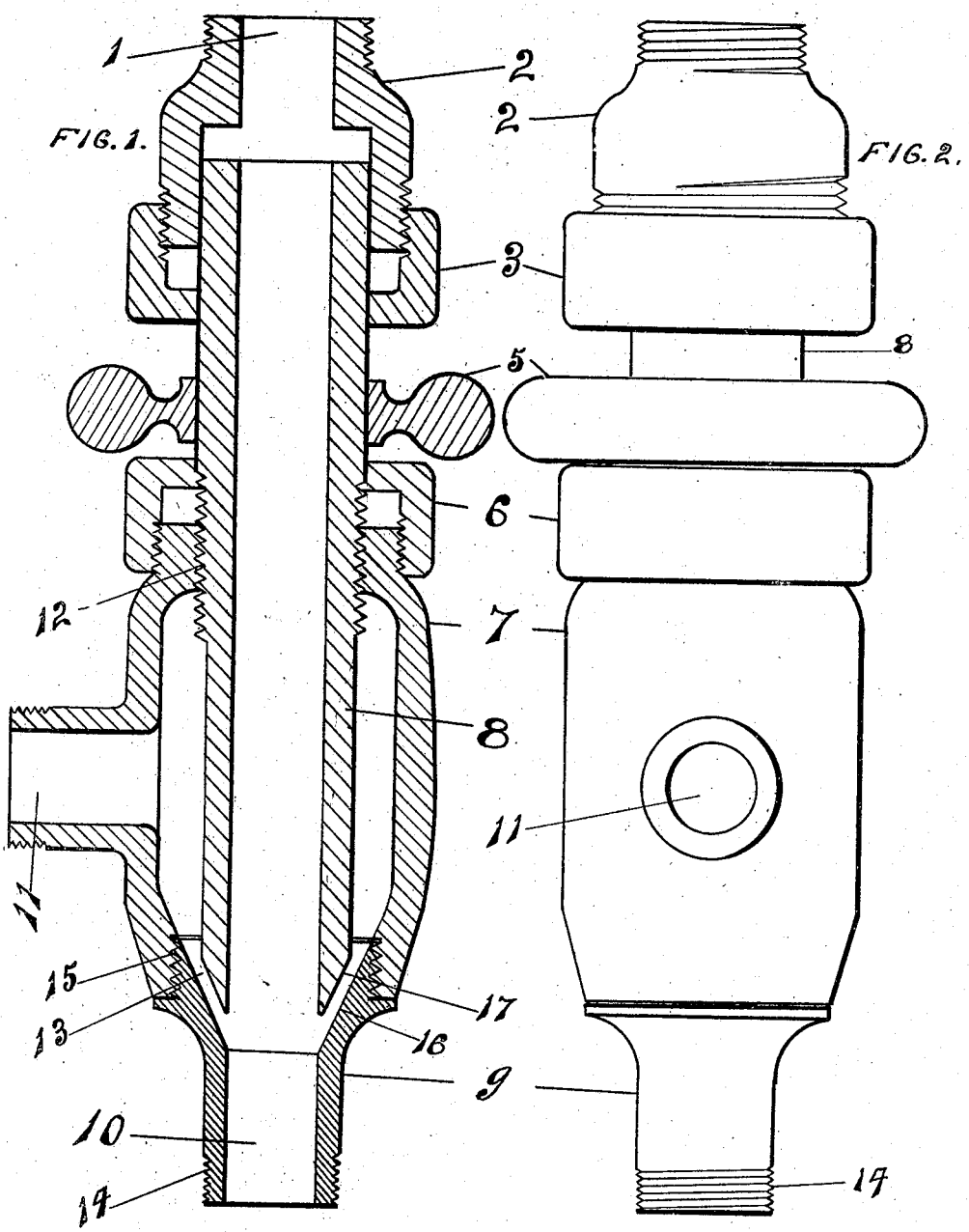

CHARLLE F. STARRE, OF PORTLAND, OREGON.

INSPIRATOR.

No. 894,758.　　Specification of Letters Patent.　　Patented July 28, 1908.

Application filed September 23, 1907. Serial No. 394,236.

*To all whom it may concern:*

Be it known that I, CHARLLE F. STARRE, a citizen of the United States, residing at Portland, in the county of Multnomah and State of Oregon, have invented a new and useful Inspirator, of which the following is a specification.

My invention is an instrument for the purpose of handling gases, liquids, or liquids containing solids of a certain percentage of mixture. This is done with a straight line movement through the instrument. I attain these objects either by the use of gases or liquids under pressure upon the following mechanism illustrated in the accompanying drawings in which Figure 1 is a section through the entire instrument, and Fig. 2 is a top or plan elevation of the same.

Similar figures refer to similar parts in different views.

1 is the suction end, or the end, through which the material comes that is to be handled.

2 is a double screwed coupling which on its outer end has a screw thread for the purpose of fastening it to the main conducting line of pipe, and which when so screwed, is allowed no lateral motion, but is held rigidly in place.

3 is a packing nut having a hole in it in one end through which 8 passes and on the other end of which is a thread which engages with thread on end of 2. As the resilience of the packing is taken up, the packing nut may be moved closer to 2 by turning it on. Thus making a tight joint at all times and permitting no escapement of the material to be handled from the main line. 6 is another packing nut; it is screwed to 7, having a hole in the end through which 8 also passes.

8 is a nozzle connection having a turned end which passes through packing nuts 6 and 3, and slides into enlarged end of 2, and a thread in its central part at 12.

5 is a hand wheel that is fastened to 8, and is for the purpose of adjusting 8 laterally, for when 8 is rotated, the screw 12 will cause 8 to move, thus increasing or diminishing the opening at 13 between 8 and 9.

7 is the pressure inlet tee, with the inlet opening at 11, through this comes the operating liquid or gas, and it entirely surrounds 8 and jets out through the opening 13.

9 is the discharge end coupling, which is also screwed into the main pipe line at 14. It is screwed into 7 at 15.

16 and 17 are turned to the same taper so that the outlet flow from 7 may, if so desired, be completely stopped by closing opening 13, or it may be adjusted so that the best results will be obtained when discharging from 10 under different pressures, or the suction is operating under variable conditions.

I claim—

The hereindescribed inspirator comprising, in combination, a suction coupling having screw threads at one end for attachment to a supply pipe, the other end having a smooth interior and screw threaded exterior, a nozzle having one end cylindrical for coöperation with said smooth portion of the coupling, the other end being conical, and being exteriorly screw threaded at its intermediate portion, a gland surrounding the cylindrical end of the nozzle and adjustably secured to the latter mentioned end of said coupling, an inlet tee embracing the conical end of the nozzle and with which the nozzle has adjustable connection at its said intermediate portion, means for rigidly connecting said tee with the main pipe line, said means having an interior surface mating the conical end of the nozzle, and means for adjusting the nozzle longitudinally of the tee.

CHARLLE F. STARRE.

Witnesses:
　CLARENCE REED,
　JOSIE SCHULMERICH.